United States Patent
Høiberg

(10) Patent No.: US 11,409,072 B2
(45) Date of Patent: Aug. 9, 2022

(54) CAM FOLLOWER AND A ZOOM LENS THEREFOR

(71) Applicant: Copenhagen Sensor Technology A/S, Herlev (DK)

(72) Inventor: Søren Høiberg, Herlev (DK)

(73) Assignee: Copenhagen Sensor Technology A/S, Herlev (DK)

( * ) Notice: Subject to any disclaimer, the term of this patent is extended or adjusted under 35 U.S.C. 154(b) by 95 days.

(21) Appl. No.: 16/768,759

(22) PCT Filed: Nov. 30, 2018

(86) PCT No.: PCT/EP2018/083132
§ 371 (c)(1),
(2) Date: Jun. 1, 2020

(87) PCT Pub. No.: WO2019/106143
PCT Pub. Date: Jun. 6, 2019

(65) Prior Publication Data
US 2021/0173176 A1 Jun. 10, 2021

(30) Foreign Application Priority Data
Dec. 1, 2017 (EP) .................... 17204888

(51) Int. Cl.
*G02B 7/10* (2021.01)
*F16H 53/06* (2006.01)
*G02B 15/16* (2006.01)
*G03B 17/12* (2021.01)

(52) U.S. Cl.
CPC .............. *G02B 7/10* (2013.01); *F16H 53/06* (2013.01); *G02B 15/16* (2013.01); *G03B 17/12* (2013.01)

(58) Field of Classification Search
CPC .......... G02B 7/10; G02B 15/16; G02B 7/023; F16H 53/06; G03B 17/12; Y10T 74/18312; Y10T 74/2107
USPC .................................................. 359/699, 700
See application file for complete search history.

(56) References Cited

U.S. PATENT DOCUMENTS

| | | | |
|---|---|---|---|
| 3,451,277 A | 6/1969 | Kieronski | |
| 6,198,578 B1 | 3/2001 | Iwasa et al. | |
| 6,487,025 B2 * | 11/2002 | Koiwai | G02B 7/021 |
| | | | 359/699 |
| 8,456,754 B2 | 6/2013 | Tsuji et al. | |
| 10,031,315 B2 * | 7/2018 | Uno | G03B 11/043 |
| 2006/0029378 A1 | 2/2006 | Noguchi | |
| 2012/0002301 A1 | 1/2012 | Nakajima | |

FOREIGN PATENT DOCUMENTS

| | | |
|---|---|---|
| EP | 1149040 B1 | 10/2003 |
| JP | 2002318337 A | 10/2002 |
| JP | 2011232688 A | 11/2011 |
| JP | 2016166960 A | 9/2016 |
| WO | 2010058722 A1 | 5/2010 |

* cited by examiner

*Primary Examiner* — Kristina M Deherrera
(74) *Attorney, Agent, or Firm* — Dinsmore & Shohl LLP

(57) ABSTRACT

A cam follower for a zoom lens is optimized for reduced damages to a zoom lens, for example if the zoom lens experiences an impact.

18 Claims, 3 Drawing Sheets

CAM FOLLOWER AND A ZOOM LENS THEREFOR

CROSS REFERENCE TO RELATED APPLICATIONS

This patent application is a national stage of International Application No. PCT/EP2018/083132, Nov. 30, 2018, which claims the priority from European Application No. 17204888.6, filed Dec. 1, 2017. Both of the aforementioned application are hereby incorporated by reference in their entireties.

FIELD OF INVENTION

The present disclosure relates to a cam follower for a zoom lens, in particular a cam follower that is optimized for reduced damages to a zoom lens, for example if the zoom lens experiences an impact.

BACKGROUND OF INVENTION

Optical zoom lenses conventionally have lens barrels with lens frames than can be moved. A mechanism combines a cam groove and a cam follower to drive the lens frames. Typically, the cam groove runs obliquely to the optical axis and the cam follower engages with the cam groove so the cam follower can slide freely. In most zoom lenses, the lens frame and/or the cam groove can be deformed during an impact, for example if the zoom lens is dropped. Various solutions to protecting zoom lenses from impact do exist. For example, zoom lenses may be made with hard materials, for example to improve the strength of the cam groove. However, a zoom lens may experience various impacts dependent on the applications. In some applications, a zoom lens may be shaken or vibrated with great force because it may be coupled to devices that experience or provide great force. Under such circumstances, a typical zoom lens will be damaged. For example, the cam groove may get a dent due to the force from the cam follower, typically coupled to a pin. After such a force, and when the pin passes the dent, the image is shaken and it is difficult to perform a smooth zoom operation. In most situations, smooth zoom operation is desired. A very special situation is when the zoom lens is coupled to a fire arm, and aligned with the bore sight of the fire arm. In such a special situation, the zoom lens optical axis must during zooming perfectly follow the bore sight of the fire arm. If not, it can be a matter of life. Thus, there is a high demand for a very impact-resistant zoom lens.

SUMMARY OF INVENTION

A purpose of the present invention is to provide a zoom lens that is highly resistant to impacts, such as from a firearm.

The present invention solves the presented drawbacks and provides first of all a cam follower that is able to transfer external force, from for example a firearm, and spread out the force such that the cam groove does not get damaged.

The present disclosure relates in a first aspect to a cam follower for a zoom lens, the cam follower comprising a body configured to slide within a first cam groove in the zoom lens. In a first embodiment the body is defined by a cuboid comprising four side-surface, a top-surface and a bottom-surface, wherein two first opposing side-surfaces are connected to two first cylindrical segments, such that the two first cylindrical segments define a first pair of surfaces, wherein at least a part of the first pair of surfaces are adapted to contact side walls of the first cam groove. The two first cylindrical segments may be defined by a first radius of curvature. In other words: A cross-section parallel to the top surface and/or the bottom surface the is defined by having two first opposing sectors of a circle defined by said first radius of curvature and two second opposing sectors of a circle defined by said second radius of curvature. Corners of the body where the side-surfaces meet are preferably rounded. In preferred embodiments the first radius of curvature is greater than the distance from the centre of the top-surface to a corner of the top-surface, and/or the first radius of curvature is greater than the distance from the centre of the bottom-surface to a corner of the bottom-surface.

Since the first pair of surfaces are adapted to contact the side walls of the first cam groove, the first opposing side surfaces are in most embodiments parallel to the side walls of the first cam groove.

In a preferred embodiment of the cam follower, the first radius of curvature is selected such that if the zoom lens experiences an impact, at least one of the first pair of surfaces will deform due to contact with at least one of the side walls of the first cam groove and increase its area of contact with the side wall of the first cam groove more rapidly than if the first radius of curvature is smaller or identical to the distance from the centre of the top-surface to a corner of the top-surface, and/or smaller or identical than the distance from the centre of the bottom-surface to a corner of the bottom-surface.

By having cylindrical segments, the area of contact increases as a function of the height of the cylindrical segments and the height of the cuboid.

If the cylindrical elements would have been matched to the cuboid such that the first radius of curvature would be identical to the distance from the centre of the top-surface to a corner of the top-surface, and/or such that the first radius of curvature would be identical to the distance from the centre of the bottom-surface to a corner of the bottom-surface, the impact would have severe damaging effects on the zoom lens, in particular the cam groove.

Accordingly, the present disclosure provides a cam follower that is adaptable to impacts and also highly resistant to impacts.

The present disclosure relates in a second aspect to a cam follower set for a zoom lens, comprising the cam follower according to the first aspect, a roller configured for rolling in a second cam groove below the first cam groove, and a pin connecting the cam follower and the roller an optical element to be translated within the zoom lens.

Finally, the present disclosure relates in a third aspect to a zoom lens, comprising the cam follower according to the first aspect.

DETAILED DESCRIPTION OF THE INVENTION

Figure 1:
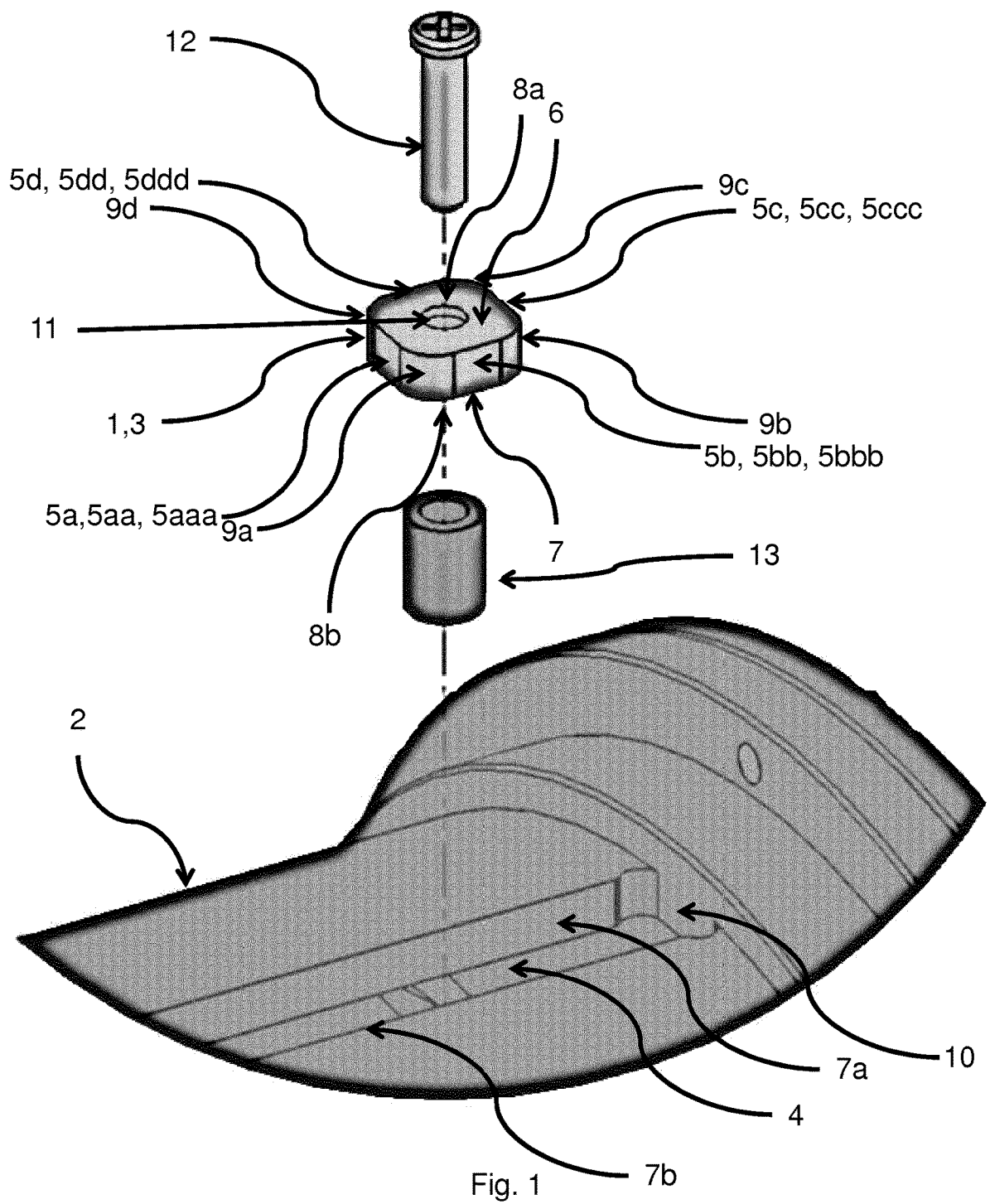
FIG. 1 is a perspective view an exemplary cam follower.

The present disclosure relates to a zoom lens that is highly resistant to impacts, such as from a firearm. A part of the zoom lens comprises a cam groove and cam follower therefor. The first aspect of the invention relates to the cam follower for a zoom lens. The cam follower is described in details in the following.

The term "cuboid" is used herein in the normal understanding of the word. According to Wikipedia a cuboid is a convex polyhedron bounded by six quadrilateral faces, whose polyhedral graph is the same as that of a cube. A rectangle is an example of a cuboid. Hence examples of cuboids that can be used in the present disclosure are rectangular cuboid, right cuboid, rectangular box, rectangular hexahedron, right rectangular prism, or rectangular parallelepiped. In a rectangular cuboid, all angles are right angles, and opposite faces of a cuboid are equal. By definition this makes it a right rectangular prism. The cube is a special case of the square cuboid in which all six faces are squares.

First Pair of Surfaces and First Radius of Curvature

In one embodiment of the cam follower, the first radius of curvature is selected such that if the zoom lens experiences an impact, at least one of the first pair of surfaces will deform due to contact with at least one of the side walls of the first cam groove and increase its area of contact with the side wall of the first cam groove more rapidly than if the first radius of curvature is smaller or identical to the distance from the centre of the top-surface to a corner of the top-surface, and/or smaller or identical than the distance from the centre of the bottom-surface to a corner of the bottom-surface.

In a second embodiment of the cam follower, the first radius of curvature is between R10 mm and R100, preferably between R30 mm and R80, more preferably between R40 and R60, most preferably around R50.

Second Pair of Surfaces and Second Radius of Curvature

In one embodiment of the cam follower, two second opposing side-surfaces are connected to two second two second cylindrical segments, such that the two second cylindrical segments define a second pair of surfaces, wherein one of the second pair of surfaces defines a first end-surface, wherein at least a part of said first end-surface is adapted to contact a first end-wall of the first cam groove, and wherein a second of the second pair of surfaces defines a second end-surface, wherein at least a part of said second end-surface is adapted to contact a second end-wall of the first cam groove, the two second cylindrical segments being defined by a second radius of curvature, wherein the second radius of curvature is greater than the distance from the centre of the top-surface to a corner of the top-surface, and/or wherein the second radius of curvature is greater than the distance from the centre of the bottom-surface to a corner of the bottom-surface.

In a second embodiment of the cam follower, the second radius of curvature is selected such that if the zoom lens experiences an impact, at least one of the second pair of surfaces will deform due to contact with at least one of said end-walls of the first cam groove and increase its area of contact with said end-wall of the first cam groove more rapidly than if the second radius of curvature is smaller or identical to the distance from the centre of the top-surface to a corner of the top-surface, and/or if the second radius of curvature is smaller or identical than the distance from the centre of the bottom-surface to a corner of the bottom-surface.

In a third embodiment of the cam follower, the second radius of curvature is between R10 mm and R100, preferably between R30 mm and R80, more preferably between R40 and R60, most preferably around R50.

In a preferred embodiment of the cam follower, the first radius of curvature and the second radius of curvature are identical.

The above described radii of curvatures have been found to provide an optimal shape to reduce and even avoid damage on the cam groove.

In a most preferred embodiment of the cam follower, the first pair of surfaces and the second pair of surfaces form a closed surface, the closed surface following a closed curve forming a curvilinear rectangle, more preferably a curvilinear square. According to the invention, the cuboid forms the rectangle or square curve. Several closed curves can be formed along the length of the cuboid. Since it is a cuboid with cylindrical segments, the several curves along the length of the cuboid are identical. The two first cylindrical segments together with the two second cylindrical segments form the curved part of the curvilinear rectangle or square.

A curvilinear square is defined as a planar geometric figure formed by four curved lines that intersect at right angles, such that successive subdivisions will yield squares in the limit of a large number of subdivisions. It has been found that such a shape provides a further optimal shape to reduce and even avoid damage on the cam groove.

As can be understood from the above explanations, the cam follower is not a cylinder. The cam follower may be stated to be a deformed normal cylinder, where the radius of curvature is not identical to the normal cylinder. Stated otherwise, the area of the closed curve around the first and second pair of surfaces is larger than an encircled circle defined within the closed curve.

Corners

In a preferred embodiment of the cam follower, the corners of the four side-surfaces are rounded by a common radius of curvature. In this embodiment, the shape is no longer definable as a curvilinear rectangle or curvilinear square, but rather a deformed curvilinear rectangle or square, where the four curved lines of the curvilinear rectangle or square instead of intersecting at right angles, now connect to each other by a curve. Thus, in this embodiment, the cam follower comprises eight curved lines that do not intersect at right angles. The eight curves do not form a common circle. By this embodiment, it has been found that the cam follower provides impact resistance from several directions and positions along the cam groove.

In a more preferred embodiment of the cam follower, the common radius of curvature is selected such that if the zoom lens experiences an impact, at least one of corners will deform due to contact with at least one of the side-walls or end-walls of the first cam groove and increase its area of contact with said end-wall or said side-wall of the first cam groove more rapidly than if the corners has no curvature.

In a most preferred embodiment of the cam follower, the common radius of curvature is between R0.1 mm and R10 mm, more preferably between R1 mm and R2 mm, most preferably around R1.5 mm.

The above described corners have been found to provide a further optimal shape to reduce and even avoid damage on the cam groove.

Materials, Dimensions and Fixture

In one embodiment of the cam follower, the body is made of steel, preferably stainless steel, more preferably stainless steel of the type 316. This material has a stiffness or hardness that provides for improved deformation during impact, thereby reducing damages to the cam groove. Further, this material is robust to harsh environments, such as where the zoom lens is exposed to water and humidity.

In some embodiments of the cam follower, the distance between the first pair of surfaces and/or second pair of surfaces is between 2 mm and 40 mm.

In some other embodiments of the cam follower, the distance between two corners of the cuboid is between 5 mm and 60 mm.

In a preferred embodiment of the cam follower, the first pair of side-surfaces is adapted for sliding in the first cam groove, wherein the first cam groove is straight. Zooming is then achieved when the cam follower moves from one end of the first cam grove to the opposite end, in particular in a smooth way. Preferably the cam follower moves along the bore sight of a fire arm.

In a most preferred embodiment of the cam follower, the height of the cam follower is between 2 mm and 40 mm. The height of the cam follower may be selected to reduce damages of the cam follower into the cam groove during impact. The higher the cam-follower, the lesser the damage on the sides of the cam groove. This is because, the area of contact with any of the sides of the cam groove increases proportional to the height of the cam follower. More particularly, this is because the cam follower is straight along the height. In other words, the cam follower follows the shape of a cuboid. In other words, the cam follower is formed non-conically. The inventors have realized that conically cam followers have a much smaller area of contact with any of the sides of the cam groove in comparison to a non-conically cam follower. A non-conically shaped cam follower is thus more efficient in reducing impact damages in zoom lenses, such as damages along the cam groove.

In most embodiments of the cam follower, the body further comprises a central hole in the cuboid for a pin to fix the cam follower in the first cam groove. This may allow the cam follower to connect to an optical element, and to further to stabilize the optical element. Finally, it may allow the optical element to be moved, when the pin, and accordingly the cam follower is moved.

Zoom Lens

In one embodiment of the zoom lens, the zoom lens further comprises the cam follower set according to the second aspect of the invention.

In a preferred embodiment of the zoom lens, the optical element is connected to a plurality of cam sets, most preferably three cam sets. Having a plurality of cam sets allows for a more stable configuration of the optical element in the zoom lens. This is very important in cases, where a zoom lens for example experiences great impacts.

Further, the zoom lens may in most embodiments be coupled to a fire arm. Thus, in such embodiments, it is very important that the optical element follows the bore sight of the fire arm. Having a plurality of cam sets may provide improved alignment of the optical element to the bore sight of the fire arm.

In most embodiments of the zoom lens, the zoom lens comprises a first barrel comprising a straight cam groove, and a second barrel placed inside the first barrel, the second barrel comprising a curved cam groove. This configuration may allow for a linear motion to drive the optical element within the zoom lens. Linear motion is preferred because it may be coupled to the shooting direction of the fire arm, this facilitating shooting and zooming along one common direction.

Example 1—A Cam Follower as Seen from a Perspective

FIG. 1 shows an example of a cam follower 1 for a zoom lens 2 according to the present invention, as shown from a perspective. Only a part of the zoom lens 2 is shown in FIG. 1. The cam follower 1 comprises a body 3 configured to slide within a first cam groove 4 in the zoom lens 2, the body 3 being defined by a cuboid comprising four side-surfaces (5a, 5b, 5c, 5d), a top-surface 6 and a bottom-surface 7. Two first opposing side-surfaces (5a and 5c, or 5b and 5d) are connected to two first cylindrical segments (5aa and 5cc, or 5bb and 5dd) (in this figure, the two first cylindrical segments are not distinguishable from the side surfaces), such that the two first cylindrical segments (5aa and 5cc or 5bb and 5dd) define a first pair of surfaces (5aaa and 5ccc or 5bbb and 5ddd), wherein at least a part of the first pair of surfaces (5aaa and 5ccc or 5bbb and 5ddd) are adapted to contact side walls 7a, 7b of the first cam groove 4. Therefore, in this case, the first pair of surfaces that contact the sidewalls are 5bbb and 5ddd. The two first cylindrical segments (thus 5bb and 5dd) are defined by a first radius of curvature, wherein the first radius of curvature is greater than the distance from the centre 8a of the top-surface 6 to a corner (9a, 9b, 9c or 9d) of the top-surface 6, and/or wherein the first radius of curvature is greater than the distance from the centre 8b of the bottom-surface 7 to a corner (9a, 9b, 9c or 9d) of the bottom-surface 7.

Further, two second opposing side-surfaces (in this case the surfaces 5a and 5c) are connected to two second two second cylindrical segments 5aa and 5cc, such that the two second cylindrical segments define a second pair of surfaces 5aaa and 5ccc, wherein one of the second pair of surfaces 5ccc defines a first end-surface, wherein at least a part of said first end-surface is adapted to contact a first end-wall 10 of the first cam groove 4, and wherein a second of the second pair of surfaces 5aa defines a second end-surface, wherein at least a part of said second end-surface is adapted to contact a second end-wall of the first cam groove (not shown here). The two second cylindrical segments 5aa and 5cc are defined by a second radius of curvature, wherein the second radius of curvature is greater than the distance from the centre of the top-surface 8a to a corner (9a, 9b, 9c or 9d) of the top-surface 6, and/or wherein the second radius of curvature is greater than the distance from the centre 8b of the bottom-surface 7 to a corner (9a, 9b, 9c or 9d) of the bottom-surface.

As can also be seen from FIG. 1, the corners (9a, 9b, 9c or 9d) of the four side-surfaces (5a, 5b, 5c and 5d) connected to the top and bottom surface, thus also the corners of the top surface or the bottom surface, are rounded by a common radius of curvature.

As further shown in FIG. 1, the first pair of side-surfaces (5bbb and 5ddd) is adapted for sliding in the first cam groove 4, wherein the first cam groove 4 is straight.

The body 3 further comprises a central hole 11 in the cuboid for a pin 12 to fix the cam follower 1 in the first cam groove 4.

FIG. 1 further shows a cam follower set for a zoom lens 2, comprising the cam follower 1, a roller 13 configured for rolling in a second cam groove 14 below the first cam groove 4, and a pin 12 connecting the cam follower 1 and the roller 13 to an optical element 15 to be translated within the zoom lens 2.

Overall, FIG. 1 shows a zoom lens 2 (i.e. a part of it), comprising embodiments of the cam follower according to the present invention. The zoom lens 2 comprises the cam follower set as described above.

Example 2—A Cam Follower as Seen from the Side

Figure 2:
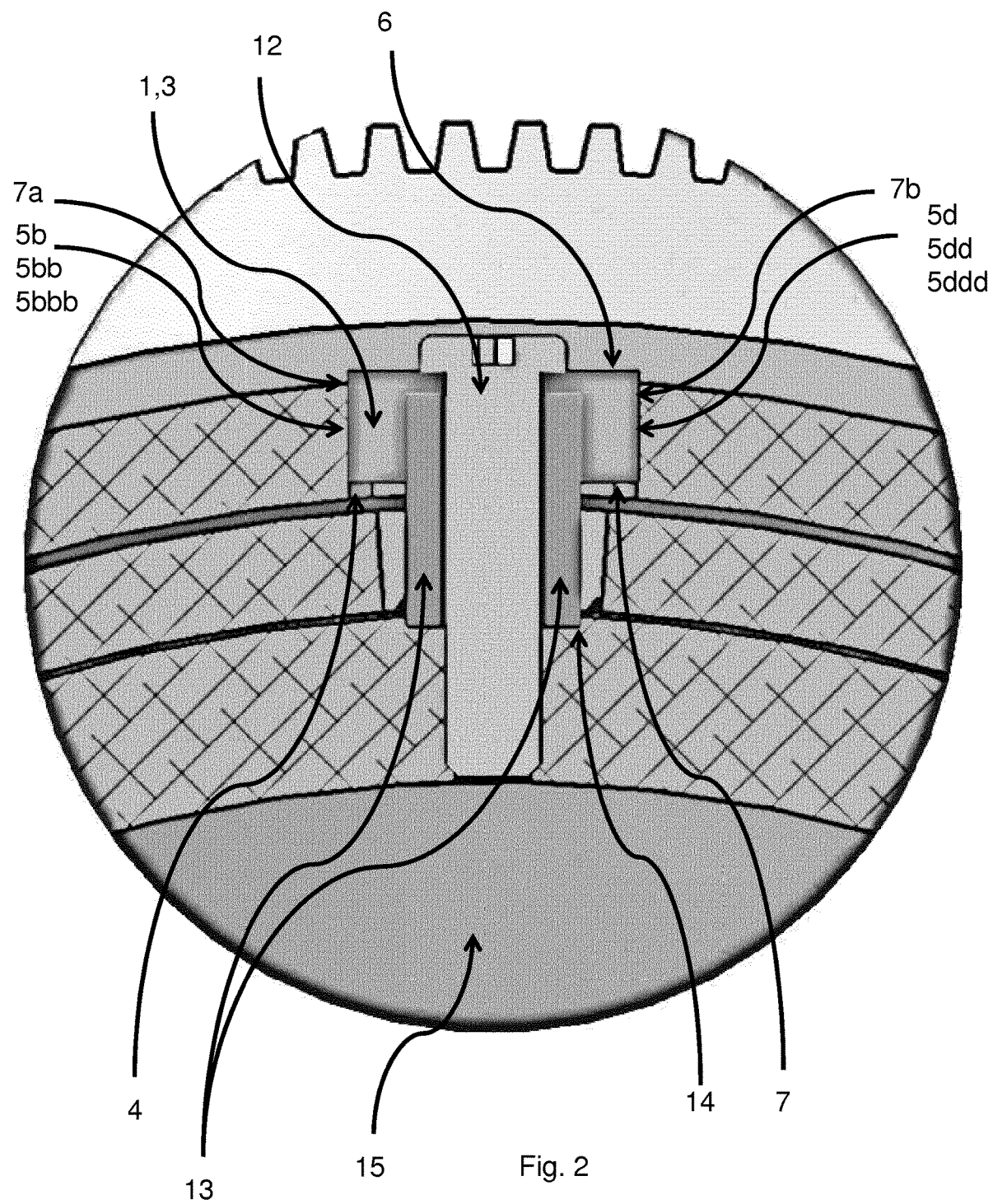
FIG. 2 is a side view of an exemplary cam follower.

FIG. 2 shows a close-up of the cam follower according to the invention, as seen from the side.

The cam follower 1 comprises a body 3 configured to slide within a first cam groove 4 in the zoom lens 2, the body 3 being defined by a cuboid comprising four side-surfaces (5*a*, 5*b*, 5*c*, 5*d*), a top-surface 6 and a bottom-surface 7. Two first opposing side-surfaces (5*b* and 5*d*) are connected to two first cylindrical segments (5*bb* and 5*dd*) (in this figure, the two first cylindrical segments are not distinguishable from the side surfaces), such that the two first cylindrical segments (5*bb* and 5*dd*) define a first pair of surfaces (5*bbb* and 5*ddd*), wherein at least a part of the first pair of surfaces (5*bbb* and 5*ddd*) are adapted to contact side walls 7*a*, 7*b* of the first cam groove 4. Therefore, in this case, the first pair of surfaces that contact the sidewalls are 5*bbb* and 5*ddd*.

The body 3 further comprises a central hole 11 in the cuboid for a pin 12 to fix the cam follower 1 in the first cam groove 4. Thus, FIG. 2 further shows a cam follower set for a zoom lens 2, comprising the cam follower 1, a roller 13 configured for rolling in a second cam groove 14 below the first cam groove 4, and a pin 12 connecting the cam follower 1 and the roller 13 to an optical element 15 to be translated within the zoom lens 2.

Overall, FIG. 2 shows a zoom lens 2 (i.e. a part of it), comprising embodiments of the cam follower according to the present invention. The zoom lens 2 comprises the cam follower set as described above.

Example 3—A Cam Follower as Seen from Above

Figure 3:
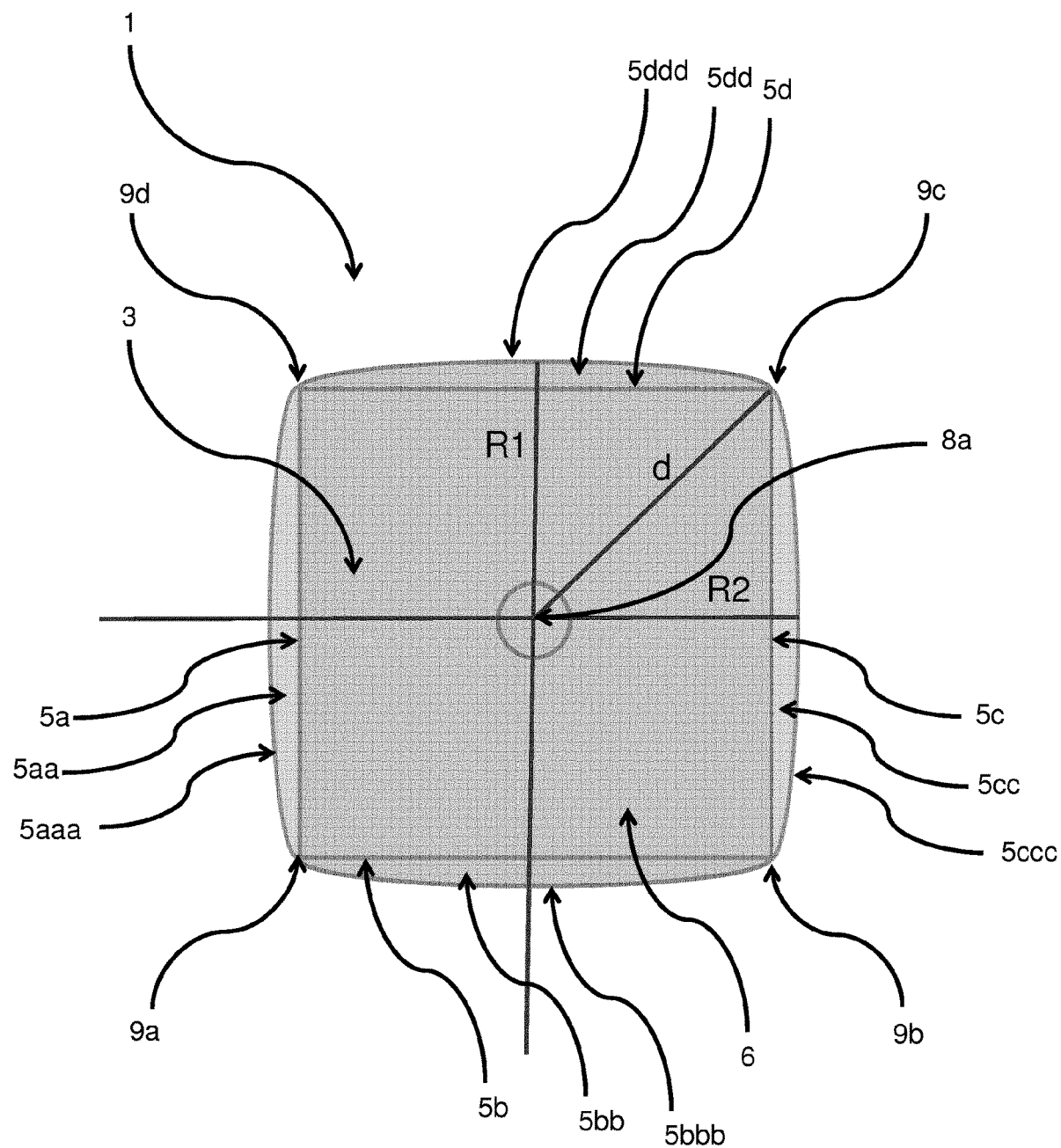
FIG. 3 is a top view of an exemplary cam follower.

FIG. 3 shows an example of a cam follower 1 for a zoom lens according to the present invention, as shown from above. The cam follower 1 comprises a body 3 configured to slide within a first cam groove 4 (not shown in this figure).

The body 3 is defined by a cuboid comprising four side-surfaces (5*a*, 5*b*, 5*c*, 5*d*), a top-surface 6 and a bottom-surface 7. Only the top surface 6 is shown in this figure.

Two first opposing side-surfaces (5*b* and 5*d*) are connected to two first cylindrical segments (5*bb* and 5*dd*) (in this figure, the two first cylindrical segments (5*bb* and 5*dd*) have been exaggerated to distinguish them from the side surfaces (5*b* and 5*d*). The two first cylindrical segments (5*bb* and 5*dd*) define a first pair of surfaces (5*bbb* and 5*ddd*), wherein at least a part of the first pair of surfaces (5*bb* and 5*dd*) are adapted to contact side walls 7*a*, 7*b* of the first cam groove 4.

The two first cylindrical segments (5*bb* and 5*dd*) are defined by a first radius of curvature R1 (shown for 5*dd* by the vertical line having the radius R1), wherein the first radius of curvature R1 is greater than the distance d from the centre 8*a* of the top-surface 6 to a corner (in this case 9*c*) of the top-surface 6, which is also a corner of the cuboid, thus also a corner of the square defined by the four surfaces (5*a*, 5*b*, 5*c*, and 5*d*). The distance d is shown by the tilted line. Clearly as seen by the figure, R1>d.

Further, two second opposing side-surfaces (in this case the surfaces 5*a* and 5*c*) are connected to two second two second cylindrical segments 5*aa* and 5*cc*, such that the two second cylindrical segments define a second pair of surfaces 5*aaa* and 5*ccc*, wherein one of the second pair of surfaces 5*ccc* defines a first end-surface, wherein at least a part of said first end-surface is adapted to contact a first end-wall 10 of the first cam groove 4 (not shown here), and wherein a second of the second pair of surfaces 5*aaa* defines a second end-surface, wherein at least a part of said second end-surface is adapted to contact a second end-wall of the first cam groove 4 (not shown here). The two second cylindrical segments 5*aa* and 5*cc* are defined by a second radius of curvature R2, wherein the second radius of curvature R2 is greater than the distance d from the centre of the top-surface 8*a* to a corner (in this case also 9*d*) of the top-surface 6.

As can also be seen from FIG. 3, the corners (9*a*, 9*b*, 9*c* or 9*d*) of the four side-surfaces (5*a*, 5*b*, 5*c* and 5*d*) connected to the top and bottom surface, thus also the corners of the top surface or the bottom surface, are rounded by a common radius of curvature.

Further details of the present invention are described by the following items.

Items

1. A cam follower for a zoom lens, the cam follower comprising a body configured to slide within a first cam groove in the zoom lens, the body being defined by a cuboid comprising four side-surfaces, a top-surface and a bottom-surface, wherein two first opposing side-surfaces are connected to two first cylindrical segments, such that the two first cylindrical segments define a first pair of surfaces, wherein at least a part of the first pair of surfaces are adapted to contact side walls of the first cam groove, the two first cylindrical segments being defined by a first radius of curvature, wherein the first radius of curvature is greater than the distance from the centre of the top-surface to a corner of the top-surface, and/or wherein the first radius of curvature is greater than the distance from the centre of the bottom-surface to a corner of the bottom-surface.

2. A cam follower for a zoom lens, the cam follower comprising a body configured to slide within a first cam groove in the zoom lens, the body comprising a top-surface, a bottom-surface and two pairs of rounded side-surfaces, wherein at least a part of at least one of the pairs of rounded side-surfaces are adapted to contact side walls of the first cam groove, wherein a cross-section of the body parallel to the top surface and/or the bottom surface of the body is defined by each of the rounded side-surfaces being a sector of a circle, the first pair of side surfaces having first radius of curvature and the second pair of side-surfaces having a second radius of curvature, wherein the first radius of curvature is greater than the distance from the centre of the top-surface to a corner of the top-surface, and/or wherein the first radius of curvature is greater than the distance from the centre of the bottom-surface to a corner of the bottom-surface.

3. The cam follower according to any of the preceding items, wherein the first radius of curvature is selected such that if the zoom lens experiences an impact, at least one of the first pair of surfaces will deform due to contact with at least one of the side walls of the first cam groove and increase its area of contact with the side wall of the first cam groove more rapidly than if the first radius of curvature is smaller or identical to the distance from the centre of the top-surface to a corner of the top-surface, and/or smaller or identical than the distance from the centre of the bottom-surface to a corner of the bottom-surface.

4. The cam follower according to any of the preceding items, wherein the first radius of curvature is between R10 mm and R100, preferably between R30 mm and R80, more preferably between R40 and R60, most preferably around R50.

5. The cam follow according to any of the preceding items, wherein two second opposing side-surfaces are connected to two second two second cylindrical segments, such that the two second cylindrical segments define a second pair of surfaces, wherein one of the second pair of surfaces defines a first end-surface, wherein at least a part of said first end-surface is adapted to contact a first end-wall of the first cam groove, and wherein a second of the second pair of surfaces defines a second end-surface, wherein at least a part of said second end-surface is adapted to contact a second end-wall of the first cam groove, the two second cylindrical segments being defined by a second radius of curvature, wherein the second radius of curvature is greater than the distance from the centre of the top-surface to a corner of the top-surface, and/or wherein the second radius of curvature is greater than the distance from the centre of the bottom-surface to a corner of the bottom-surface.

6. The cam follower according to item 5, wherein the second radius of curvature is selected such that if the zoom lens experiences an impact, at least one of the second pair of surfaces will deform due to contact with at least one of said end-walls of the first cam groove and increase its area of contact with said end-wall of the first cam groove more rapidly than if the second radius of curvature is smaller or identical to the distance from the centre of the top-surface to a corner of the top-surface, and/or if the second radius of curvature is smaller or identical than the distance from the centre of the bottom-surface to a corner of the bottom-surface.

7. The cam follower according to any of the items 5-6, wherein the second radius of curvature is between R10 mm and R100, preferably between R30 mm and R80, more preferably between R40 and R60, most preferably around R50.

8. The cam follower according to any of the items 5-7, wherein the first radius of curvature and the second radius of curvature are identical.

9. The cam follower according to any of the preceding items, wherein the first pair of surfaces and second pair of surfaces form a closed surface, the closed surface following a curve forming a curvilinear rectangle, more preferably a curvilinear square.

10. The cam follower according to any of the preceding items, wherein corners of the four side-surfaces are rounded by a common radius of curvature.

11. The cam follower according to item 10, wherein the common radius of curvature is selected such that if the zoom lens experiences an impact, at least one of corners will deform due to contact with at least one of the side-walls or end-walls of the first cam groove and increase its area of contact with said end-wall or said side-wall of the first cam groove more rapidly than if the corners has no curvature.

12. The cam follower according to any of the items 10-11, wherein the common radius of curvature is between R0.1 mm and R10 mm, more preferably between R1 mm and R2 mm, most preferably around R1.5 mm.

13. The cam follower according to any of the preceding items, wherein the body is made of steel, preferably stainless steel, more preferably stainless steel of the type 316.

14. The cam follower according to any of the preceding items, wherein the distance between the first pair of surfaces and/or second pair of surfaces is between 2 mm and 40 mm.

15. The cam follower according to any of the preceding items, wherein the distance between two corners of the cuboid is between 5 mm and 60 mm.

16. The cam follower according to any of the preceding items, wherein the first pair of side-surfaces is adapted for sliding in the first cam groove, wherein the first cam groove is straight.

17. The cam follower according to any of the preceding items, wherein the body further comprises a central hole in the cuboid for a pin to fix the cam follower in the first cam groove.

18. A cam follower set for a zoom lens, comprising the cam follower according to item 1, a roller configured for rolling in a second cam groove below the first cam groove, and a pin connecting the cam follower and the roller an optical element to be translated within the zoom lens.

19. A zoom lens, comprising the cam follower according to any of the preceding items.

20. The zoom lens according to item 19, further comprising the cam follower set according to item 18.

21. The zoom lens according to item 19, wherein the optical element is connected to a plurality of cam sets, most preferably three cam sets.

22. The zoom lens according to any of the preceding items 19-21, wherein the zoom lens comprises a first barrel comprising a straight cam groove, and a second barrel placed inside the first barrel, the second barrel comprising a curved cam groove.

The invention claimed is:

1. A cam follower for a zoom lens of the type having a first cam groove with side walls and first and second end-walls, the cam follower comprising:
    a generally cuboid body configured to slide within the first cam groove in the zoom lens, the body comprising four side-surfaces, a top-surface and a bottom-surface;
    the four side-surfaces comprising a first pair of opposed surfaces and a second pair of opposed surfaces;
    the first pair of opposed surfaces each being defined as a surface of a first cylindrical segment, at least a part of the first pair of opposed surfaces adapted to contact the side walls of the first cam groove;
    the second pair of opposed surfaces each being defined as a surface of a second cylindrical segment;
    one of the second pair of opposed surfaces defining a first end-surface, at least a portion of the first end-surface adapted to contact the first end-wall of the first cam groove;
    a second of the second pair of opposed surfaces defining a second end-surface, at least a portion of the second end-surface adapted to contact the second end-wall of the first cam groove;
    the surfaces of the first cylindrical segments each being defined by a first radius of curvature, the first radius of curvature being:
        greater than a distance from a center of the top-surface of the body to a corner of the top surface; and/or
        greater than a distance from a center of the bottom-surface of the body to a corner of the bottom-surface.

2. The cam follower according to claim 1, wherein:
    the surfaces of the second cylindrical segments each being defined by a second radius of curvature, the second radius of curvature being:
        greater than a distance from a center of the top-surface of the body to a corner of the top surface; and/or
        greater than a distance from a center of the bottom-surface of the body to a corner of the bottom-surface.

3. The cam follower according to claim 2, wherein the second radius of curvature of at least one of the second pair of surfaces is configured such that the at least one of the second pair of surfaces increases its area of contact with the end-wall of the first cam groove under an impact.

4. The cam follower according to claim 2, wherein the first radius of curvature and the second radius of curvature are identical.

5. The cam follower according to claim 2, wherein the first pair of surfaces and second pair of surfaces form a closed surface, the closed surface following a curve forming a curvilinear rectangle, or a curvilinear square.

6. The cam follower according to claim 2, wherein corners of the four side-surfaces are each rounded by a common radius of curvature.

7. The cam follower according to claim 6, wherein the common radius of curvature is selected such that if the zoom lens experiences an impact, at least one of corners will deform due to contact with at least one of the side-walls or end-walls of the first cam groove and increase its area of contact.

8. The cam follower according to claim 6, wherein the common radius of curvature is between 0.1 mm and 10 mm, or between 1 mm and 2 mm, or approximately 1.5 mm.

9. The cam follower according to claim 1, wherein:
the first radius of curvature of at least one of the first pair of surfaces is configured such that the at least one of the first pair of surfaces increases its area of contact with the side wall of the first cam groove under an impact.

10. The cam follower according to claim 1, wherein the first radius of curvature is between 10 mm and 100 mm, or between 30 mm and 80 mm, or between 40 mm and 60 mm, or approximately 50 mm.

11. The cam follower according to claim 1, wherein the first pair of side-surfaces is adapted for sliding in the first cam groove, the first cam groove being straight.

12. The cam follower according to claim 1, wherein the body further comprises a central hole in the generally cuboid body for a pin to fix the cam follower in the first cam groove.

13. A cam follower set for a zoom lens having a first cam groove and a second cam groove below the first cam groove, comprising:
the cam follower according to claim 1;
a roller configured for rolling in a second cam groove; and
a pin connecting the cam follower and the roller such that an optical element can be translated within the zoom lens.

14. A zoom lens, comprising at least one cam follower set according to claim 13.

15. The zoom lens according to claim 14, wherein the zoom lens comprises a first barrel comprising a straight cam groove, and a second barrel placed inside the first barrel, the second barrel comprising a curved cam groove.

16. The zoom lens according to claim 14, wherein the at least one cam follower set comprises a plurality of cam follower sets, the zoom lens further comprising an optical element connected to the plurality of cam follower sets.

17. The zoom lens according to claim 16, wherein the optical element is connected to three cam sets.

18. A zoom lens, comprising the cam follower according to claim 1.

* * * * *